United States Patent
Goyal

(10) Patent No.: US 6,711,607 B1
(45) Date of Patent: Mar. 23, 2004

(54) DYNAMIC SCHEDULING OF TASK STREAMS IN A MULTIPLE-RESOURCE SYSTEM TO ENSURE TASK STREAM QUALITY OF SERVICE

(75) Inventor: Pawan Goyal, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/498,450

(22) Filed: Feb. 4, 2000

(51) Int. Cl.⁷ .............................................. G06F 15/16
(52) U.S. Cl. ........................ 709/203; 709/226; 709/105
(58) Field of Search ............................... 709/203, 229, 709/226, 235, 219, 225, 105, 103, 102

(56) References Cited

U.S. PATENT DOCUMENTS

| | | |
|---|---|---|
| 3,377,624 A | 4/1968 | Nelson et al. |
| 4,177,510 A | 12/1979 | Appell et al. ............... 364/200 |
| 5,212,793 A | 5/1993 | Donica et al. |
| 5,226,160 A | 7/1993 | Waldron et al. |
| 5,249,290 A | 9/1993 | Heizer |
| 5,263,147 A | 11/1993 | Francisco et al. ........... 395/425 |
| 5,437,032 A | 7/1995 | Wolf et al. |
| 5,528,753 A | 6/1996 | Fortin |
| 5,584,023 A | 12/1996 | Hsu |
| 5,603,020 A | 2/1997 | Hashimoto et al. ......... 395/616 |
| 5,636,371 A | 6/1997 | Yu ............................. 395/500 |
| 5,640,595 A | 6/1997 | Baugher et al. |
| 5,692,047 A | 11/1997 | McManis ....................... 380/4 |
| 5,706,097 A | 1/1998 | Schelling et al. ........... 358/296 |
| 5,706,453 A | 1/1998 | Cheng et al. |
| 5,708,774 A | 1/1998 | Boden |
| 5,719,854 A | 2/1998 | Choudhury et al. |
| 5,761,477 A | 6/1998 | Wahbe et al. ........... 395/406 A |
| 5,781,550 A | 7/1998 | Templin et al. ............. 370/401 |
| 5,799,173 A | 8/1998 | Gossler et al. |

(List continued on next page.)

FOREIGN PATENT DOCUMENTS

WO     WO 99/39261     8/1999

OTHER PUBLICATIONS

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring–97/CS614/goy.html>.

(List continued on next page.)

*Primary Examiner*—Dung C. Dinh
(74) *Attorney, Agent, or Firm*—Fenwick & West LLP

(57) ABSTRACT

A multi-resource system dynamically allocates its resources amongst multiple task streams to provide quality of service guarantees to the task streams. A quality of service manager maintains quality of service requirement information for a plurality of task streams, and requests processing of received tasks. An arbitrator assigns tasks streams and their tasks amongst various servers providing access to resources. The assignment is such that the total quality of service guarantees of the task streams assigned to each server does not exceed the total availability or capacity of the resource. When all assigned tasks for a server are blocked, the server notifies the arbitrator, which transfers an unblocked task to it. When a blocked task unblocks on a server handling a transferred task, the arbitrator transfers back the previously transferred task to its originating server.

18 Claims, 3 Drawing Sheets

U.S. PATENT DOCUMENTS

| | | |
|---|---|---|
| 5,809,527 A | 9/1998 | Cooper et al. .............. 711/133 |
| 5,828,893 A | 10/1998 | Weid et al. ................. 395/800 |
| 5,838,916 A | 11/1998 | Domenikos et al. ... 395/200.49 |
| 5,842,002 A | 11/1998 | Schnurer et al. ............ 395/500 |
| 5,845,129 A | 12/1998 | Wendorf et al. ............ 395/726 |
| 5,860,004 A | 1/1999 | Fowlow et al. |
| 5,905,859 A | 5/1999 | Holloway et al. |
| 5,913,024 A | 6/1999 | Green et al. ................. 395/186 |
| 5,915,085 A | 6/1999 | Koved ......................... 395/186 |
| 5,915,095 A | 6/1999 | Miskowiec |
| 5,918,018 A | 6/1999 | Gooderum et al. .... 395/200.55 |
| 5,920,699 A | 7/1999 | Bare |
| 5,933,603 A | 8/1999 | Vahalia et al. |
| 5,937,159 A | 8/1999 | Meyers et al. ......... 395/187.01 |
| 5,956,481 A | 9/1999 | Walsh et al. ................ 395/186 |
| 5,978,373 A | 11/1999 | Hoff et al. |
| 5,987,524 A | 11/1999 | Yoshida et al. |
| 5,999,963 A | 12/1999 | Bruno et al. |
| 6,023,721 A | 2/2000 | Cummings .................. 709/201 |
| 6,038,608 A | 3/2000 | Katsumata |
| 6,038,609 A | 3/2000 | Geulen |
| 6,055,617 A | 4/2000 | Kingsbury |
| 6,065,118 A | 5/2000 | Bull et al. ................... 713/200 |
| 6,075,938 A | 6/2000 | Bugnion et al. ....... 395/500.48 |
| 6,086,623 A | 7/2000 | Broome et al. |
| 6,092,178 A | 7/2000 | Jindal et al. |
| 6,094,674 A | 7/2000 | Hattori et al. |
| 6,108,701 A | 8/2000 | Davis et al. |
| 6,108,759 A | 8/2000 | Orcutt et al. ............... 711/173 |
| 6,154,776 A * | 11/2000 | Martin ........................ 709/228 |
| 6,154,778 A * | 11/2000 | Koistinen et al. ........... 709/228 |
| 6,167,520 A | 12/2000 | Touboul ..................... 713/200 |
| 6,172,981 B1 | 1/2001 | Cox et al. |
| 6,192,389 B1 | 2/2001 | Ault et al. ................... 709/101 |
| 6,192,512 B1 | 2/2001 | Chess ............................ 717/5 |
| 6,230,203 B1 | 5/2001 | Koperda et al. |
| 6,240,463 B1 | 5/2001 | Benmohamed et al. |
| 6,247,057 B1 | 6/2001 | Barrera, III |
| 6,279,039 B1 * | 8/2001 | Bhat et al. .................. 709/226 |
| 6,279,040 B1 | 8/2001 | Ma et al. |
| 6,282,703 B1 | 8/2001 | Meth et al. |
| 6,286,047 B1 | 9/2001 | Ramanathan et al. |
| 6,314,558 B1 | 11/2001 | Angel et al. |
| 6,327,622 B1 | 12/2001 | Jindal et al. |
| 6,336,138 B1 | 1/2002 | Caswell et al. |
| 6,351,775 B1 | 2/2002 | Yu |
| 6,353,616 B1 * | 3/2002 | Elwalid et al. ............. 370/443 |
| 6,363,053 B1 * | 3/2002 | Schuster et al. ............ 370/230 |
| 6,385,638 B1 | 5/2002 | Baker-Harvey |
| 6,393,484 B1 | 5/2002 | Massarani |
| 6,434,631 B1 | 8/2002 | Bruno et al. |
| 6,487,578 B2 | 11/2002 | Ranganathan |
| 6,499,137 B1 | 12/2002 | Hunt |
| 6,529,950 B1 * | 3/2003 | Lumelsky et al. .......... 709/218 |
| 6,553,413 B1 | 4/2003 | Lewin et al. |
| 6,578,068 B1 * | 6/2003 | Bowman-Amuah ......... 709/203 |

OTHER PUBLICATIONS

Goyal, P., "Packet Scheduling Algorithms for Integrated Services Networks," PhD Dissertation, University of Texas, Austin, TX, Aug. 1997.

Pending U.S. patent application entitled "Providing Quality of Service Guarantees to Virtual Hosts," Ser. No.r 09/452, 286, filing date Nov. 30, 1999.

Pending U.S. patent application entitled "Selective Interception of System Calls," Ser. No. 09/499,098, filing date Feb. 4, 2000.

Keshav, S., *An Engineering Approach to Computer Networking: ATM Networks, the Internet, and the Telephone Network*, Reading, MA, Addison–Wesley, 1997, pp. vii–xi, 85–115, 209–355, 395–444.

Tanenbaum, A. S. and Woodhull, A. S., *Operating Systems: Design and Implementation*, Upper Saddle River, NJ, Prentice Hall, 1997, pp. vii–xiv, 1–46, 401–454.

Rubini, A., *LINUX Device Drivers*, Sebastopol, CA, O'Reilly & Associates, Inc., 1998, pp. v–x, 13–40.

Goyal, P., et al., "A Hierarchical CPU Scheduler for Multimedia Operating Systems," *Proceedings of the Second Symposium Operating Systems Design and Implementations (OSDI '96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp. v–viii, 43–74.

Aho, A. V. and Ullman J. D., *Principles of Compiler Design*, Reading, MA, 1977, pp vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in–Progress session*, San Francisco, CA, Dec. 4, 1997, pp. 31–34.

Rusling, D. A., Processes, [online], [retrieved on Dec. 7, 1999]. Retrieved from the Internet: <URL: http://www.cebaf.gov/~saw/linux/tlk–html/node44.html>.

Rusling, D. A., Linux Processes, [online], [retrieved on Dec. 7, 1999]. Retrieved from the Internet: <URL: http://www.cebaf.gov/~saw/linux/tlk–html/node45.html.

Rusling, D. A., Identifiers, [online], [retrieved on Dec. 7, 1999]. Retrieved from the Internet: <URL: http://www.cebaf.gov/~saw/linux/tlk–html/node46.html>.

Rusling, D. A., Scheduling, [online], [retrieved on Dec. 7, 1999]. Retrieved from the Internet: <URL: http://www.cebaf.gov/~saw/linux/tlk–html/node47.html>.

Rusling, D. A., Scheduling in Multiprocessor Systems, [online], [retrieved on Dec. 7, 1999]. Retrieved from the Internet: <URL: http://www.cebaf.gov/~saw/linux/tlk–html/node48.html>.

Rusling, D. A., Files, [online], [retrieved on Dec. 7, 1999]. Retrieved from the Internet: <URL: http://www.cebaf.gov/~saw/linux/tlk–html/node49.html>.

Stevens, R. W., *UNIX Network Programming Volume 1 Networking APIs: Sockets and XTI*, Upper Sadle River, NJ, Prentice Hall, 1998, pp. v–xiv, 29–53, 85–110, 727–760.

Plummer, D. C., *An Ethernet Address Resolution Protocol—or—Converting Network Protocol Addresses to 48.bit Ethernet Address for Transmission on Ethernet Hardware*, Nov. 1982, [online], [retrieved on Jan. 17, 2000]. Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999–Sep. 3, 1999, pp. 95–108.

Campbell, A. T. and Keshav, S., "Quality of Service in Distributed Systems," *Computer Communications 21*, 1998, pp. 291–293.

Bach, M. J., *The Design of the UNIX® Operating System*, New Delhi, Prentice–Hall of India, 1989, pp. v–x, 19–37.

McDougall, R., et al., *Resource Management*, Upper Saddle River, NJ, Prentice Hall, 1999, pp. iii–xix, 135–191.

Rijsinghani, A., RFC 1624, May 1994, [online], [Retrieved Feb. 2, 2000]. retrieved from the internet: <URL: http://www.faqs.org/rfcs/rfc1624.html>.

Mallory, T and Kullberg, A., RFC 1141, Jan. 1990 [online], [retrieved Feb. 2, 2000]. retrieved from the internet: <URL: http://www.faqs.org/rfcs/rfc1141.html>.

Egevang, K. and Francis P., RFC 1631, May 1994 [online], [retrieved Feb. 2, 2000]. retrieved from the Internet: <URL: http://www.faqs.org/rfcs/rfc1631.html>.

Boehm, B., "Managing Software Productivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp. 335–344.

Deutsch, P. and Grant, C.A., "A Flexible Measurement Tool for Software Systems," Information Processing 71 (Proc. of the IFIP Congress), 1971, pp. 320–326.

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp. 1–17.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment for Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp. 34–45.

Pandey, R. and Hashii, B., "Providing Fine–Grained Access Control For Mobile Programs Through Binary Editing," Technical Report TR98 08, University of California, Davis, CA, 1998, pp. 1–22.

Ritchie, D. M., "The Evolution of the Unix Time–Sharing System," AT&T Bell Laboratories Technical Journal 63, No. 6, Part 2, Oct. 1984, (originally presented 1979), 11 pages.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/>.

Wahbe, R., et al., "Efficient Software–Based Fault Isolation," Proc. of the Symposium on Operating System Principles, 1993, 14 pages.

Symbol Table, [online] copyright 1997, 1998, [Retrieved on Apr. 4, 2003] Retrieved from the internet < URL: http://216.239.33.100/search?q=cache:eASXX8qC_–AC:www.caldera.com/developers/gabi/1998–04–29/ch4.s..., pp. 1–5.

* cited by examiner

| Server 1 | |
|---|---|
| Runnable Tasks | Blocked Tasks |
| | T1 |
| | T2 |

| Server 2 | |
|---|---|
| Runnable Tasks | Blocked Tasks |
| T3 | |
| T4 | |

| Current Assignment Table 114 | | |
|---|---|---|
| Task | Originating Server | Current Server |
| T1 | Server 1 | Server 1 |
| T2 | Server 1 | Server 1 |
| T3 | Server 2 | Server 2 |
| T4 | Server 2 | Server 2 |

Prior to Transfer
Fig. 3a

| Server 1 ("Idle") | |
|---|---|
| Runnable Tasks | Blocked Tasks |
| T4 | T1 |
| | T2 |

| Server 2 ("Busy") | |
|---|---|
| Runnable Tasks | Blocked Tasks |
| T3 | |

| Current Assignment Table 114 | | |
|---|---|---|
| Task | Originating Server | Current Server |
| T1 | Server 1 | Server 1 |
| T2 | Server 1 | Server 1 |
| T3 | Server 2 | Server 2 |
| T4 | Server 2 | Server 1 |

After Transfer of T4
Fig. 3b

| Server 1 ("Idle") | |
|---|---|
| Runnable Tasks | Blocked Tasks |
| T1 | T2 |

| Server 2 ("Busy") | |
|---|---|
| Runnable Tasks | Blocked Tasks |
| T3 | |
| T4 | |

| Current Assignment Table 114 | | |
|---|---|---|
| Task | Originating Server | Current Server |
| T1 | Server 1 | Server 1 |
| T2 | Server 1 | Server 1 |
| T3 | Server 2 | Server 2 |
| T4 | Server 1 | Server 1 |

After Re-transfer of T4
Fig. 3c

DYNAMIC SCHEDULING OF TASK STREAMS IN A MULTIPLE-RESOURCE SYSTEM TO ENSURE TASK STREAM QUALITY OF SERVICE

BACKGROUND

1. Field of Invention

The present invention relates generally to scheduling resources on computer systems, and more particularly, to systems and methods for scheduling resources on multiple servers.

2. Background of the Invention

Scheduling the execution of processes and the use of resources in a computer is a fundamental part of operating system design. In conventional computer operating systems, there are various system resources available to processes, such as the processor itself, disk drives, memory, network connections, and so forth. An operating system includes a scheduler that schedules individual processes for execution, and further that allocates resources to various ones of the processes. The scheduler may operate in conjunction with a quality of service manager that provides quality of service (QOS) guarantees to individual processes or tasks. A quality of service guarantee typically ensures that a given process will have a certain percent share of some resource's availability. For example, a process may be given a 30% QOS guarantee for the processor, meaning that it will receive at least 30% of the available processor cycles (or some other metric of processor availability). Research in scheduling algorithms has addressed scheduling on both single processor and multiprocessor systems. However, conventional scheduling algorithms typically address scheduling efficiency when considering processes individually.

In many instances, it may be necessary to schedule otherwise distinct processes in a coordinated fashion. More particularly, distinct processes may be related to a particular entity for which it is desired to provide quality of service guarantees for all of the entity's processes.

For example, consider a server computer providing services, such as file transfers, database queries, packet routing, to a number of client computers. Each client computer communicates with the server computer more or less concurrently, each providing an ongoing stream of requests and data in the form of packets that need to be processed by the server. Normally, each individual request of a client would be processed by the server as an individual process, and scheduled accordingly. However, it may be desirable to provide quality of service guarantees with respect to each of the client computers, and not merely with respect to individual processes. This would be desirable to ensure that each client obtains a particular quality of service from the server computer. In particular, this is desirable in order to differentially price the level of service provided to different clients based upon the quality of service they are guaranteed. In this fashion, client computers who are guaranteed a higher quality of service pay a premium price. For example, a company paying for a high QOS guarantee could receive higher priority processing for all of its database queries, even though each individual query is a separate process. Conventionally, providing differential quality of service and pricing to different client computers has required that separate server computers be provided for each client computer. This approach is costly, and thus makes it further desirable to handle multiple clients using a multi-processor system or the like.

A task stream is a set of tasks or process that are all issued on behalf of the same entity and that all share a common resource allocation or quality of service requirement. Examples of task streams are flows of packets that share a resource allocation, and sets of processes that jointly share a machine's resources such as CPU, memory, or disk bandwidth. For example, a task stream may be a flow of packets, where all the packets for a particular client request constitute a task stream.

Several task streams may want to use a single resource at the same time. In this case, the task streams are placed in a queue of task streams, awaiting their individual turns. It is commonly desired to provide a task stream with a guaranteed allocation of a system resource. For instance, it may be desired to guarantee that all 'high-priority' processes receive at least 10% of a machine's CPU.

Algorithms to schedule a queue of task streams on a single processor to give each task stream a guaranteed share of processor resources are well known in the art. With multiprocessor systems becoming widespread, it is now feasible to process a queue of task streams using multiple servers in parallel. However, known single processor scheduling algorithms do not extend to the multiprocessor case.

Accordingly, it is desirable to provide a scheduling system and methodology that guarantees a quality of service to various task streams being served by multiple processors (or other resources) in parallel.

SUMMARY OF THE INVENTION

The present invention overcomes the limitations of conventional scheduling algorithms by providing and enforcing quality of service guarantees to individual task streams being served by multiple, parallel resources. One embodiment operates in a computer system having a number of servers. A server may be a physical processor, or a server process executing on a processor. Each server managed or controls some system resource, such as CPU, memory, disk, network interface card, and the like. In either case, multiple servers ate available to handle tasks that are being received for processing.

Each task is associated with a particular task stream preferably by some form of task stream identification number, process ID, packet attribute, or the like. As noted above, a task stream may be associated with a an entity, such as a particular client computer or application which generates or is related to otherwise independent tasks or processes having a common quality of service requirement. Each task stream has a previously determined quality of service requirement that it will receive for all of its tasks. For example, a task stream may have a 30% quality of service requirement, so that it receives 30% of the available capacity of system resources, such as CPU time. Each task stream may have a different quality of service requirement.

As a task is received into the system, the task stream with which it is associated is determined. Periodically, the task streams are partitioned or allocated among the various servers. The allocation of task streams to each server is done so that the total quality of service requirements of the task streams assigned to each server does not exceed the total availability of the resource that each server manages. For example, the allocation is preferably such that the total quality of service requirements for each server's resource does not exceed 100% of the resource's availability. The allocation of task streams to servers may be made by any type of allocation algorithm, such as first fit or best fit, or the like.

Each server executes its task streams according to some scheduling order, which may be determined by any uniprocessor scheduling algorithm. Individual tasks may be either runnable or waiting (blocked). If all of the tasks for one of the servers are waiting, then the server is idle. A runnable task from one of the other (busy) servers with runnable tasks is moved from a busy server to the idle server, where it can be immediately processed. The selection of which task and from which server may be made according to various criteria, allowing for optimization. This feature of moving runnable tasks from busy servers to idle servers is desirable because it helps ensure that each task will receive the quality of service guarantee defined for its associated task stream.

Preferably, if a waiting task on the previously idle server becomes runnable, then the task that was moved to this server is moved back to its originating server. The newly runnable task is executed, as it would have been before blocking. The re-transfer of runnable tasks back to their originating servers is desirable because it prevents tasks that are blocked temporarily from being repeatedly delayed by other tasks that are taken up by the server. This helps further ensure that the quality of service requirements are met for those task streams having blocked tasks, without sacrificing the quality of service provided to the task streams of transferred tasks (which suffer no loss in quality of service by being transferred or transferred back).

One embodiment of the present invention employs a quality of service manager, an arbitrator, and a number of servers, each of which manages a resource. The quality of service manager is responsible for setting quality of service requirements for individual task streams, and storing this assignment information. The quality of service manager receives incoming tasks, and determines from their process ID, task ID, packet ID, or other data which task streams they are respectively associated with, and hence what quality of service requirement is associated with each task.

When a new task is received by the quality of service manager, it queries the arbitrator to determine if there is sufficient resource capacity to meet the quality of service requirements for the task stream associated with the task. The arbitrator maintains a master quality of service table that identifies each server, the task streams originally assigned to each server, and each server's current total quality of service commitments to the task streams assigned to it. The arbitrator also stores a current assignment table that indicates which tasks are currently assigned to each server; this table is updated anytime a task is transferred from one server to another.

If the task stream cannot be allocated to one of the servers without the total quality of service commitment of that server exceeding the total resource capacity of the resource managed by the server, then the task is denied. Otherwise, the arbitrator provides the quality of service manager with the ID of the server to which the task stream is assigned. The arbitrator updates the master quality of service table to show the assignment of the task stream to the server, and that server's new total quality of service commitment. Each server also maintains its own quality of service table that records the task D and quality of service requirement for its task streams.

In one embodiment, each server maintains its tasks in a task stream queue, which may include a runnable task queue and a blocked tasked queue. Tasks are initially assigned to the runnable task queue, but when a task blocks, the server moves the task to the blocked queue. When a server detects there are no entries in its runnable queue (it is idle), it informs the arbitrator. The arbitrator selects a runnable task from another server's runnable queue and moves it to the runnable queue of the idle, first server. The arbitrator also updates the current assignment table to indicate the current assignment of the task to the first server. If a task becomes unblocked on the first server, the first server preempts the transferred task, and informs the arbitrator. The arbitrator determines from the master quality of service table the original server from which the task was transferred, and moves the task back to this originating server from the first server.

These and other features and attributes of the present invention are now described in more detail with reference to the following figures.

BRIEF DESCRIPTION OF THE DRAWINGS

FIGS. 3a–3b are tables illustrating the transfer of tasks between servers. FIGS. 3a–3c are tables illustrating the transfer of tasks between servers.

Detailed Description of the Preferred Embodiment

Figure 1:
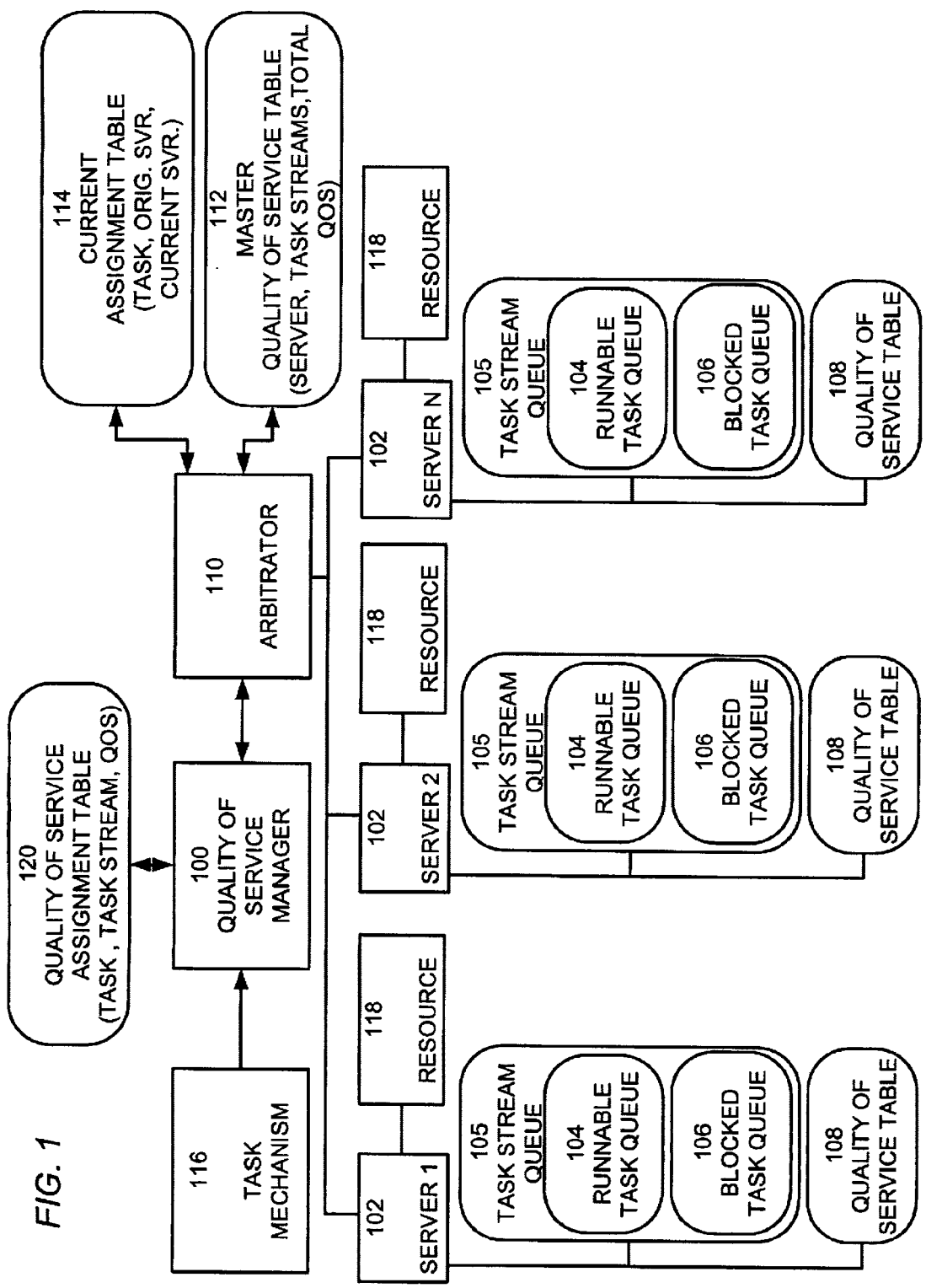
FIG. 1 is a software architecture of a system in accordance with the present invention.

Referring now to FIG. 1, there is shown the software architecture of a system in accordance with one embodiment of the present invention. A task mechanism 116 processes task requests into the system. These task requests may be for any type of processing or data manipulation task that can be handled by the various servers 102 or resources 118 of the system. Typical tasks include, but are not limited to, transmitting packets to, or decoding packets received from, a network source; executing software processes; reading or writing data files; accessing or storing records in a database, and so forth.

The task mechanism 116 provides its task requests to the quality of service manager 100, each task request including some form of identifying or distinguishing data, such as a task ID, file type, process ID, packet ID, source or destination address, protocol, or the like, that may be used to associate the task with a task stream. The manner in which tasks are generated by the task mechanism 116 will vary, and thus so will the particular data or attributes used to identify task streams. For example, one species of tasks are processes to be executed by a processor. How processes are generated varies by operating system; for example, in UNIX®, processes are generated by a fork system call, which would serve as the task mechanism 116 for one embodiment. Another species of tasks are packets to be transferred to a network via a network interface card, and the task mechanism 116 is any process that generates the packets.

The quality of service manager 100 is responsible for establishing and maintaining quality of service guarantees for task streams. The quality of service manager 100 uses a quality of service assignment table 120 that stores for each task stream information identifying each task stream (e.g., a task stream ID) and a predefined quality of service for the task stream. If need be, the quality of service manager 100 may further store data associating particular information from the tasks (e.g., task ID, packet ID, or process ID) with the information identifying the task streams.

There are various ways to determine the relationship between a task and a task stream. In one embodiment, where tasks are processes to be executed, the task stream of a new process may be the task stream defined for the parent process. Alternatively, a privileged (e.g., root administrator accessible only) program may be used to define an explicit mapping between each process and task stream. In the case of packets, the task stream assignment may be based on a mapping function between packet header attributes and task streams. Any of the packet header attributes may be used for this mapping, for example, the IP address, the L2 address, or protocol type. For example, a mapping may be defined between particular IP addresses and task streams, with a set of one or more IP addresses being associated with a particular task stream (many-to-one mapping). This mapping feature enables specific client computers, having specific IP addresses, to each be given a particular QOS guarantee for all of its tasks (which form a task stream). In this way, the owner of each computer may be charged a service fee that is related to the QOS provided to its computer. The quality of service guaranteed to a task stream may be established by the system administrator according to any desired protocol or manner. In one embodiment, the quality of service for a task stream is specified in terms of percentage of a resource's availability.

The quality of service manager 100 communicates with an arbitrator 110 to request processing of a task with the quality of service defined for its task stream The arbitrator 110 is responsible for assigning a task stream (and thus initially all of its tasks) to whichever server (if any) has sufficient resource availability to provide the quality of service specified for the task stream.

In one embodiment, the arbitrator 110 manages this function by maintaining a master quality of service table 112 and a current assignment table 114. The master quality of service table 112 lists each server 102, the task streams assigned to the server 102 along with each task stream's quality of service requirement, and the current total quality of service requirement at each server 102. The current assignment table 114 lists tasks that have been assigned to each server—including transferred tasks—and the server 102 from which a task was transferred (if any).

The arbitrator 110 is coupled to a number of servers 102 (shown in FIG. 1 as servers 1 to N). Each server 102 is responsible for managing a resource 118, which provides any type of service to tasks, such as a disk drive providing disk access, or a network interface card providing network access, a processor for executing processes, a printer, and so forth. In one embodiment, each server 102 maintains a task stream queue 105, which may be implemented in turn using a runnable task queue 104 and a blocked task queue 106.

The runnable task queue 104 for each server 102 lists tasks assigned to the server 102 that are runnable and awaiting execution. The blocked task queue 106 lists tasks that are blocked from execution for whatever reason, such as awaiting further user or system data, unavailability of a resource, or the like. These queues need not be physically separate: a single queue of tasks may be used by including a flag with each task indicating its status as runnable or blocked. A task is initially assigned to the runnable task queue 104, and is moved by the server 102 into the blocked task queue 106 when the task blocks. When the task unblocks the server 102 moves the task to the runnable task queue 104.

Each server 102 also maintains a quality of service table 108 that lists each of the tasks assigned to the server 102, its associated task stream, and its associated quality of service requirement. The total value of the quality of service requirements for all assigned task streams is preferably always equal to or less than the total resource availability of the server's resource 118.

The various elements of this software architecture may be executed on various types of conventional computer hardware. A typical embodiment will include a server-type computer, preferably having multiple processors, one or more network interface cards for communicating with other computers, storage devices such as large capacity disk arrays, and addressable memory for executing an operating system (e.g., UNIX, LINUX, Windows NT), the quality of service manager 100, arbitrator, and various servers 102.

Figure 2:
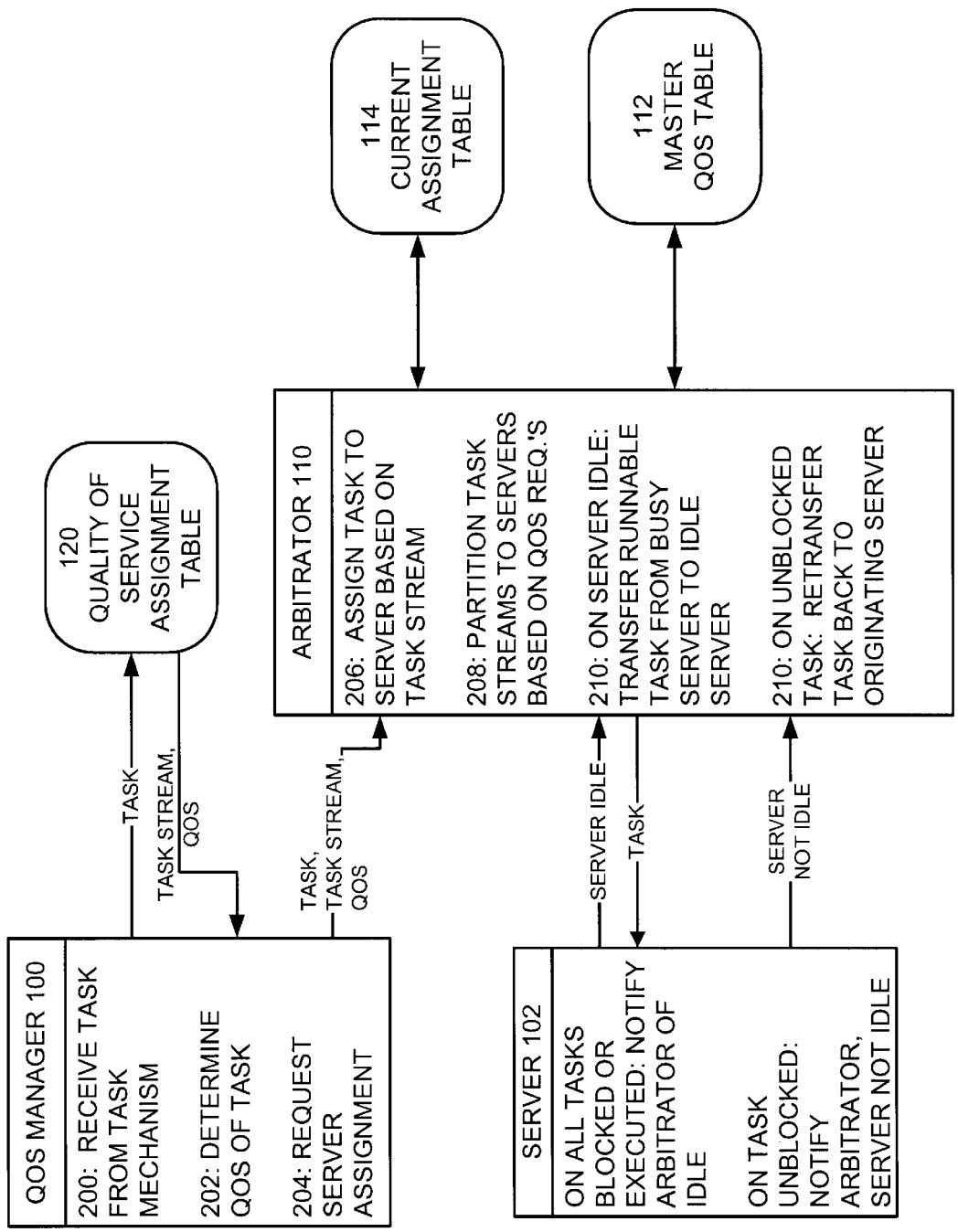
FIG. 2 is a flowgraph of the operation of one embodiment of the present invention.

Referring now to FIG. 2 there is a shown a detailed flowgraph of the overall process of scheduling tasks in accordance with the present invention, The operation of the present invention may be understood from the vantage point of when a task is received into the system. Accordingly, the quality of service manager 100 receives 200 a task request from a task mechanism 116 to process the task.

The quality of service manager 100 reads some data from the task request (e.g. a process ID, packet header attribute, etc.) and determines 202 from its quality of service assignment table 120 which task stream is associated with the task, and the corresponding quality of service that task stream is guaranteed. The quality of service manager 100 requests 204 the arbitrator 110 to assign 206 the task to a server 102, given the quality of service requirement for the task stream, and the task stream to which the task is assigned.

The arbitrator 110 determines from the master quality of service table 112 whether the task stream associated with the task has been previously assigned to a server or if the task stream is a new task stream. If the task stream has been previously assigned to a server, then the task is assigned 206 to this particular server 102. The arbitrator 110 updates the master quality of service table 112 to indicate that the task stream has been assigned to the particular server 102, and its quality of service requirement. The current assignment table 114 is also updated to show the initial assignment of a task to the server, with the assigned server indicated as both the originating and current server. The task is placed in the runnable task queue 104 of the server to which it is assigned. The task streams in the queues of the individual servers may be scheduled using any conventional uni-processor scheduling algorithm.

If the task stream has not been previously assigned to a server, the arbitrator assigns 206 the task stream and the task to one of the server, selecting the server so that the resulting total quality of service commitment for all of the task streams assigned to the server is less than the total available resource capacity. The arbitrator 110 updates the quality of service table 112 to reflect the new assignment and total quality of service commitment; likewise, the server updates its own quality of service table 108. The arbitrator 110 also updates the current assignment table 114 to indicate the assignment of the task to the server, listing the assigned server as the originating server and as the current server.

If necessary to allow assignment of the new task stream, the arbitrator 110 partitions 208 all of the current task streams amongst the server 102. In so partitioning the task streams, the arbitrator again assigns (or re-assigns as need be) the task streams to the various servers 102 so as to ensure that the total quality of service requirements for all task assigned to each server (considering both the runnable and blocked queues 104, 106) does not exceed the total available resource associated with each server. The partitioning algorithm may be based, for example, on a first fit, or other allocation method.

For example, assume there are three servers, Server 1, Server 2, and Server 3, with the following current total quality of service commitments from their assigned task streams (here expressed in terms of percentage of total), in an example master quality of service table 112.

| Master Quality of Service Table 112 | | |
| --- | --- | --- |
| Server | Total QOS | Assigned Task Stream (QOS Requirement) |
| Server 1 | 60% | TS1 (25%), TS2 (20%), TS5 (15%) |
| Server 2 | 90% | TS3 (40%), TS4 (50%) |
| Server 3 | 55% | TS6 (55%) |

Further, assume a new task for existing task stream TS1 is received by the quality of service manager 100. The quality of service manager 100 requests the arbitrator 110 to assign the task to an appropriate server. In this example, task stream T1 has already been assigned to Server 1, and so the arbitrator assigns the task to this server. The current assignment table 114 is also updated to show the assignment of the new task to Server 1, with Server 1 being both the originating and current server.

Assume now that a new task for a new task stream TS7 is requested, and that task stream TS7 has a quality of service guarantee of 25%. Using a first fit algorithm, the arbitrator 110 may assign task stream TS7 to Server 1, since the resulting total quality of service commitment would only be 85%. Server 2 cannot be assigned the task stream, since at 115% the total quality of service requirement would exceed the total resource availability. Using a best fit algorithm, arbitrator 110 may assign the task stream to Server 3, since this server has the most available capacity.

Finally, assume that TS7 instead had a quality of service requirement of 60%. In this case, the arbitrator 110 may repartition 208 the task streams amongst the various servers, for example as follows:

| Master Quality of Service Table 112 | | |
| --- | --- | --- |
| Server | Total QOS | Assigned Task Stream (QOS Requirement) |
| Server 1 | 100% | TS1 (25%), TS2 (20%), TS5 (55%) |
| Server 2 | 90% | TS3 (40%), TS4 (50%) |
| Server 3 | 75% | TS6 (15%), TS7 (60%) |

This repartitioning allows task stream TS7 to be assigned to Server 3, instead of being rejected.

However, if another new task stream TS8 is now requested with a quality of service requirement of 60% it will be rejected, since no repartitioning 208 will allow this task stream to be assigned to any server without exceeding that server's total availability.

as each of the servers 102 process the task streams in their respective runnable task queues 104, various tasks in these runnable task queues will block; the server 102 then moves (or updates) the task to its blocked task queue 106. At some point, one of the servers 102 may have all of its tasks blocked, with all of its tasks moved to its blocked task queue 106. The server 102 then notifies the arbitrator 110 of its status as now being 'idle.' A server may also notify the arbitrator that it is idle when all tasks in its queues have been executed.

When the arbitrator 110 receives notice that a server is idle, it identifies in the current assignment table 114 at least one runnable task that is assigned to another 'busy' server, that is a server that has at least one task in its runnable task queue 104 (this server is also called herein an 'originating' server). The arbitrator 110 transfers 210 this runnable task(s) from the busy server to the idle server. The arbitrator 110 further updates the current assignment table 114 to indicate the transfer, with the idle server now as the currently assigned server. The selection of which task to transfer may be based on various selection criteria, such as selecting the highest priority task, the task from the longest runnable task queue 104, the task resulting in the least amount of cache misses, and so on.

At some point, an idle server may have one or more of its tasks unblock while executing a transferred task. If so, the idle server pre-empts the transferred task, and informs the arbitrator 110. The server also begins processing of the unblocked task.

The arbitrator then determines from the current assignment table 114 which task(s), if any, have been transferred to the idle server. The arbitrator may determine which tasks have been transferred since the originating server and the current server will be different. Alternatively, the arbitrator may set a flag set to indicate a transferred task, and then check for these flags. The arbitrator re-transfers such task(s) back to its originating server. This ensures that the task that unblocked on the idle server receives its quality of service commitment, while at the same time not degrading the quality of service provided to the transferred task(s).

Referring now to FIGS. 3a–3c, there is shown an example of these steps of managing transferred tasks. In the figures, there are shown two servers, Server 1 and Server 2, and their respective runnable task queues 104 and blocked task queues 106. Tasks T1 and T2 are initially assigned to Server 1 and tasks T3 and T4 are initially assigned to Server 2. The tasks are in the respective runnable task queues 104 and awaiting service or being serviced by the server's resources 118. The current assignment table 1 14 shows each server as both the originating and current server.

In FIG. 3a, both task streams T1 and T2 on Server 1 have blocked, and Server 1 is now idle. Server 1 notifies the arbitrator 110 of this state, aid the arbitrator selects a runnable task stream, such as T4 from Server 2 to transfer to Server 1. Since now another task stream is present, Server 1 can begin immediate servicing of task T4. The arbitrator also updates the current assignment table 114 to show that task stream T4 has been transferred from Server 2 to Server 1. See FIG. 3b. The arbitrator 110 may use any selection algorithm or criteria to determine which runnable task stream(s) to transfer. For example, the arbitrator may select the task stream having the highest quality of service requirement, or it may select the last task in the longest task queue for any of the servers.

In FIG. 3c, task T1 has unblocked and Server 1 has moved the task back to its runnable task queue 104. Server 1 preempts task stream T4, and notifies the arbitrator 11 0. The arbitrator determines from the current assignment table 114 of FIG. 3b which tasks have been transferred to Server 1, and here identifies T4. It further determines that Server 2 was the originating server. Accordingly, the arbitrator re-transfers task T4 back to Server 2. In some instances a transferred task may not be pre-emptible (e.g., a packet being transmitted to the network), in which case the task is not pre-empted, and not transferred back to its originating server.

In summary, the present invention provides a software architecture and method that ensures quality of service guarantees for task streams in multi-resource/server environments. The method may be encoded in a software product, including executable code portions that define the functional and structural features of the quality of service manager, the arbitrator, and various tables, and the behavior of the servers.

The foregoing describes in detail the features and benefits of the present invention in various embodiments. Those of skill in the art will appreciate that the present invention is capable of various other implementations that operate in accordance with the foregoing principles and teachings. For example, the arrangement and organization of the various task queues, and the various tables used to track the status of task streams and their quality of service requirements may be altered and managed by different elements. The tables may store different data, and may differ in number or relationship to each other. The functionality of partitioning the task streams to the servers, and transferring task streams between servers may be held in multiple different entities instead of by the arbitrator or its equivalent. Certainly, the names of the various entities may be changed without impacting their functional operations. Accordingly, this detailed description is not intended to limit the scope of the present invention, which is to be understood by reference to the claims below.

I claim:

1. In a system including a plurality of resources for servicing tasks, each resource associated with a server for managing tasks on the resource, a computer-implemented method of providing quality of service guarantees to task streams, each task stream having a plurality of associated tasks and a quality of service requirement for obtaining a defined portion of the availability of at least one of the resources, the method comprising;
   assigning each task stream to one of the servers, the task streams assigned so that the total quality of service requirements of the task streams assigned to each server does not exceed the total resource availability of the resource associated with each server; and
   responsive to all of the tasks of the task streams assigned to a first server being blocked, transferring at least one runnable task form a task stream assigned to a second server to the first server, to allow the runnable task to access the resource associated with the first server.

2. The method of claim 1, further comprising:
   responsive to at least one blocked tasks on the first server becoming runnable, transferring at least one runnable task from the first server back to the second server to allow the at least one runnable task to be processed on the second server.

3. The method of claim 1, further comprising:
   periodically re-assigning the task streams to the servers so that the total quality of service requirements of the task streams currently assigned to each server does not exceed the total resource availability of the resource associated with each server.

4. The method claim 1, further comprising:
   receiving a task of a new task stream; and
   assigning the new task stream to one of the servers by selecting a server so that the total quality of service requirements of the task streams currently assigned to the server and the new task stream does not exceed the total resource availability of the resource associated with the server.

5. The method of claim 4, wherein assigning the new task stream farther comprises:
   re-assigning currently assigned task streams and the new task stream to the servers so that the total quality of service requirements of the task streams currently assigned to each server does not exceed the total resource availability of the resource associated with each server.

6. The method of claim 1, further comprising:
   receiving a task of a new task stream;
   determining whether the new task stream can be assigned to one of the servers so that the total quality of service requirements of the task streams currently assigned to the server and the new task stream does not exceed the total resource availability of the resource associated with the server; and
   responsive to the new task stream not being capable of being assigned to any of the servers, rejecting the new task.

7. A computer-implemented method of providing quality of service guarantees to task streams by allocating resources in a computer, the method comprising:
   receiving a plurality of tasks, and assigning each task to a task stream, each task stream having a quality of service requirement for obtaining a defined portion of at least one resource's availability;
   partitioning the task streams into a plurality of task stream queues, each task stream queue associated with a server for providing the task streams access to a resource managed by the server, the task streams partitioned so that the total quality of service requirements of the task streams in each server's task stream queue does not exceed the total resource availability of the resource associated with the server; and
   responsive to all of the tasks on a first server being blocked, transferring at least one runnable task from a second server to the first server, to allow the runnable task to be processed by the first server.

8. The method of claim 7, further comprising:
   responsive to at least one blocked tasks on the first server becoming runnable, transferring at least one runnable task from the first server back to the second server to allow the at least one runnable task to be processed on the second server.

9. The method of claim 7, wherein partitioning the task streams into a plurality of task stream queues further comprises:
   partitioning the task streams into the task stream queues using a best fit partitioning algorithm.

10. The method of claim 7, wherein partitioning the task streams into a plurality of task stream queues further comprises:
    partitioning the task streams into the task stream queues using a first fit partitioning algorithm.

11. The method of claim 7, further comprising:
    on each server, scheduling the task streams in the task stream queue associated with the server using a uni-processor scheduling algorithm.

12. A computer system for providing quality of service guarantees to task streams by allocating resources in a computer, the system comprising:
    a plurality of system resources, each resource having a maximum resource availability;
    a plurality of servers, each server associated with one of the resources, each server having a task stream queue including runnable and blocked tasks;

a quality of service manager that maintains for each task stream a quality of service requirement; and that determines for a received task the task stream associated with the task; and an arbitrator communicatively coupled to the quality of service manager and the servers, that receives from the quality of service manager task requests including a quality of service requirement and the task stream associated with a task, and assigns a task to the task stream queue of one of the servers, so that each task stream queue contains only tasks of task streams having a total quality of service requirement That docs not exceed the maximum resource availability of the resource associated with the server.

13. The computer system of claim 12, wherein:

each server, responsive to all of its tasks being blocked notifies the arbitrator that it is idle, and responsive to at least one task becoming unblocked, notifies the arbitrator that it is no longer idle; and the arbitrator, responsive to a first server being idle, transfers at least one runnable task from a second server to the first server, and responsive to the first server no longer being idle, re-transfers the runnable task to the second server.

14. The computer system of claim 12, further comprising:

a master quality of service table coupled to the arbitrator and storing information identifying each of the servers, the task streams assigned to each server, and the total quality of service requirement of the task streams assigned to each server.

15. The computer system of claim 12, further comprising:

a current assignment table coupled to the arbitrator and storing information identifying one or more task, the original server to which the one or more tasks is assigned, and a current server to which the one or more tasks is assigned, the arbitrator in response to transferring a task from a second server to a first, updating the current server information to indicate the second server as the current server of the task.

16. The computer system of claim 12, further comprising:

a quality of service assignment table coupled to the quality of service manager and storing information identiting each task stream, and the quality of service requirement of each task stream.

17. The computer system of claim 12, further comprising:

a quality of service table coupled to each server, and storing information identifying each task assigned to the server and the quality of service requirement of the task stream associated with the task.

18. In a computer system having a plurality system resources, each resource having a maximum resource availability, and a plurality of servers, each server associated with one of the resources, each server having a task stream queue including runnable and blocked tasks, a computer program product encoded on a computer readable medium, the computer program product for providing quality of service guarantees to the task streams, the computer program product comprising:

a quality of service manager that maintains for each task stream a quality of service requirement; and that determines for a received task the task stream associated with the task; and an arbitrator communicatively coupled to the quality of service manager and the servers that receives from the quality of service manager task requests including a quality of service requirement and the task stream associated with a task, and assigns a task to the task stream queue of one of the servers, so that each task stream queue contains only tasks of task streams having a total quality of service requirement that does not exceed the maximum resource availability of the resource associated with the server.

\* \* \* \* \*

UNITED STATES PATENT AND TRADEMARK OFFICE
CERTIFICATE OF CORRECTION

PATENT NO.   : 6,711,607 B1
DATED        : March 23, 2004
INVENTOR(S)  : Pawan Goyal It is certified that error appears in the above-identified patent and that said Letters Patent is hereby corrected as shown below:

Column 9,
Line 44, please change "form" to -- from --
Line 48, please change "tasks" to -- task --

Column 10,
Line 2, please change "farther" to -- further --
Line 40, please change "tasks" to -- task --

Column 11,
Line 12, please change "That docs" to -- that docs --
Line 34, please change "task" to -- tasks --

Column 12,
Line 6, please change "identiting" to -- identifying --
Line 13, please insert -- of -- between "plurality" and "system"

Signed and Sealed this

Thirteenth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,711,607 B1  
APPLICATION NO. : 09/498450  
DATED : March 23, 2004  
INVENTOR(S) : Pawan Goyal It is certified that error appears in the above-identified patent and that said Letters Patent is hereby corrected as shown below:

Column 11, line 12, please change "That docs" to "that does"

Signed and Sealed this

Twenty-first Day of November, 2006

JON W. DUDAS  
*Director of the United States Patent and Trademark Office*